No. 830,347. PATENTED SEPT. 4, 1906.
D. MENDELSON.
ELECTRIC MOTOR.
APPLICATION FILED NOV. 8, 1905.
6 SHEETS—SHEET 1.
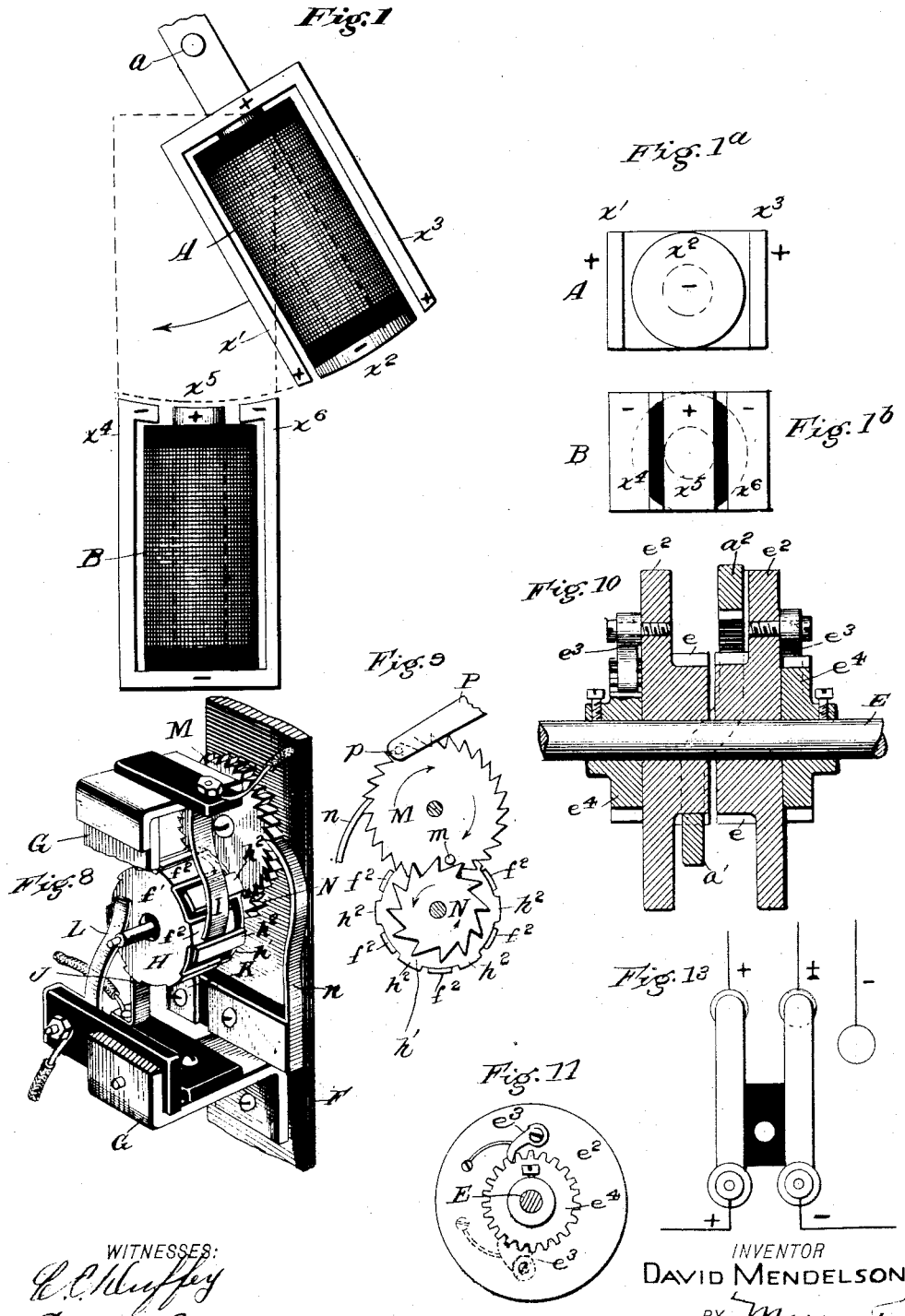
INVENTOR
DAVID MENDELSON

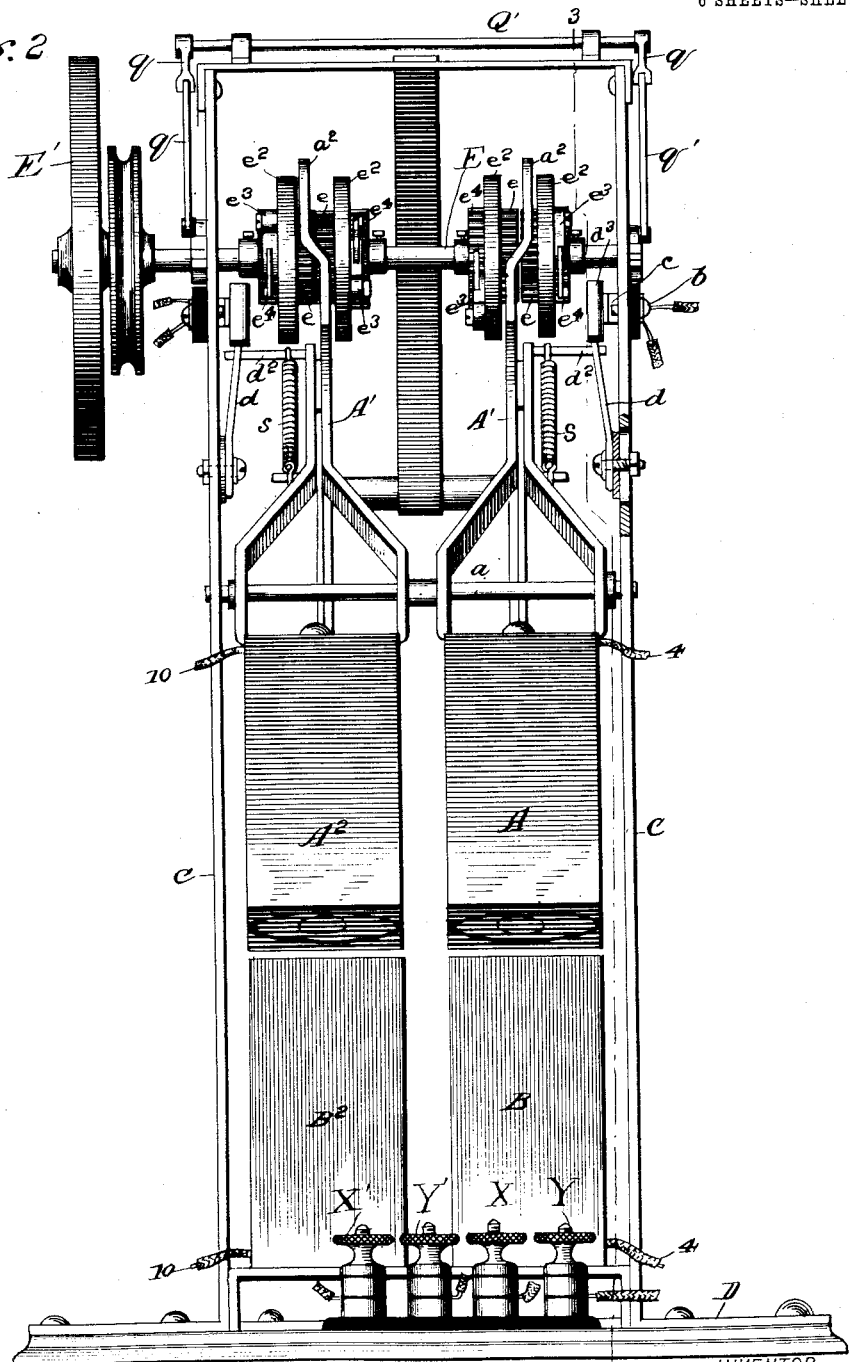

No. 830,347. PATENTED SEPT. 4, 1906.
D. MENDELSON.
ELECTRIC MOTOR.
APPLICATION FILED NOV. 8, 1905.
6 SHEETS—SHEET 3.
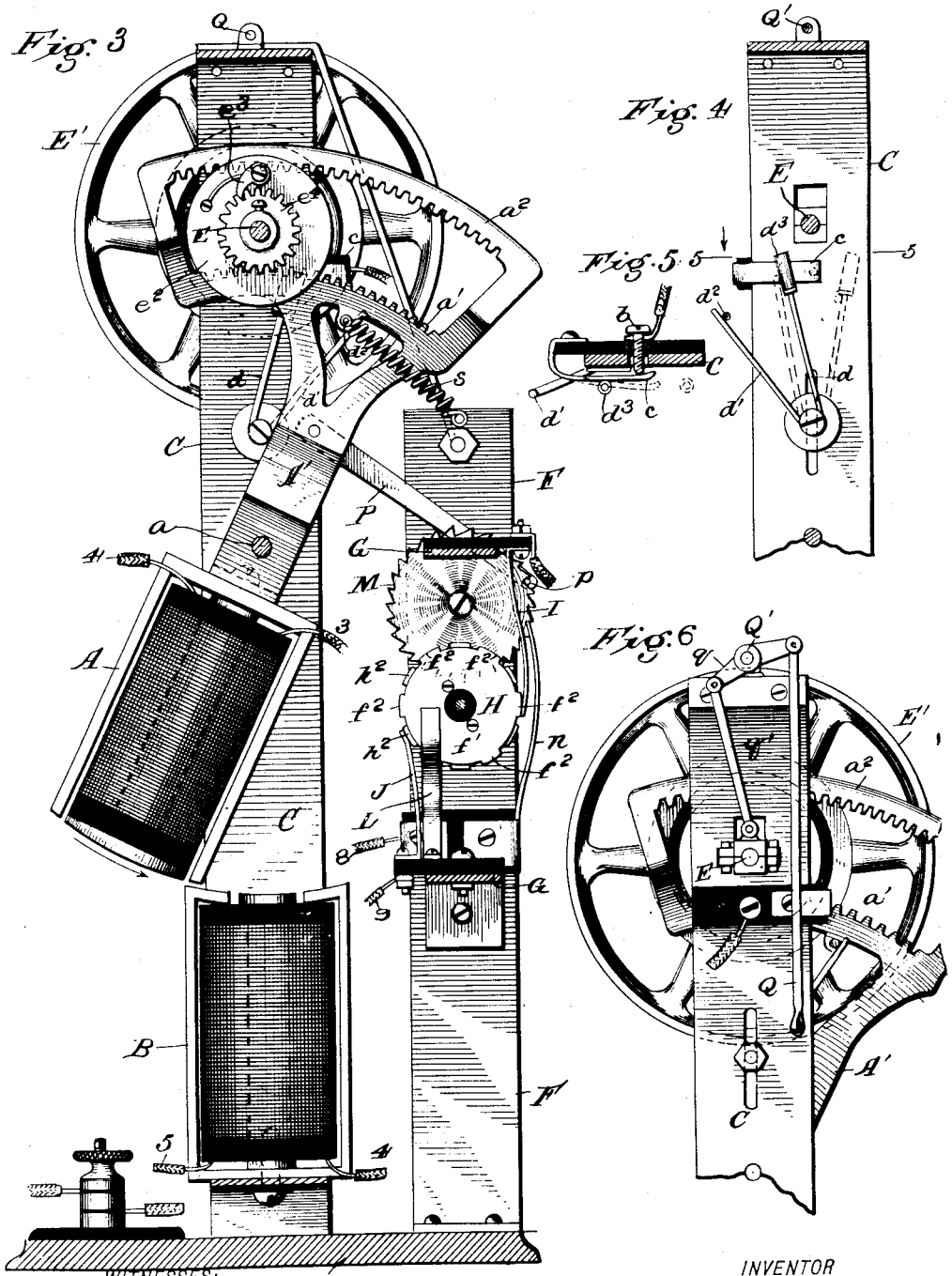
INVENTOR
DAVID MENDELSON

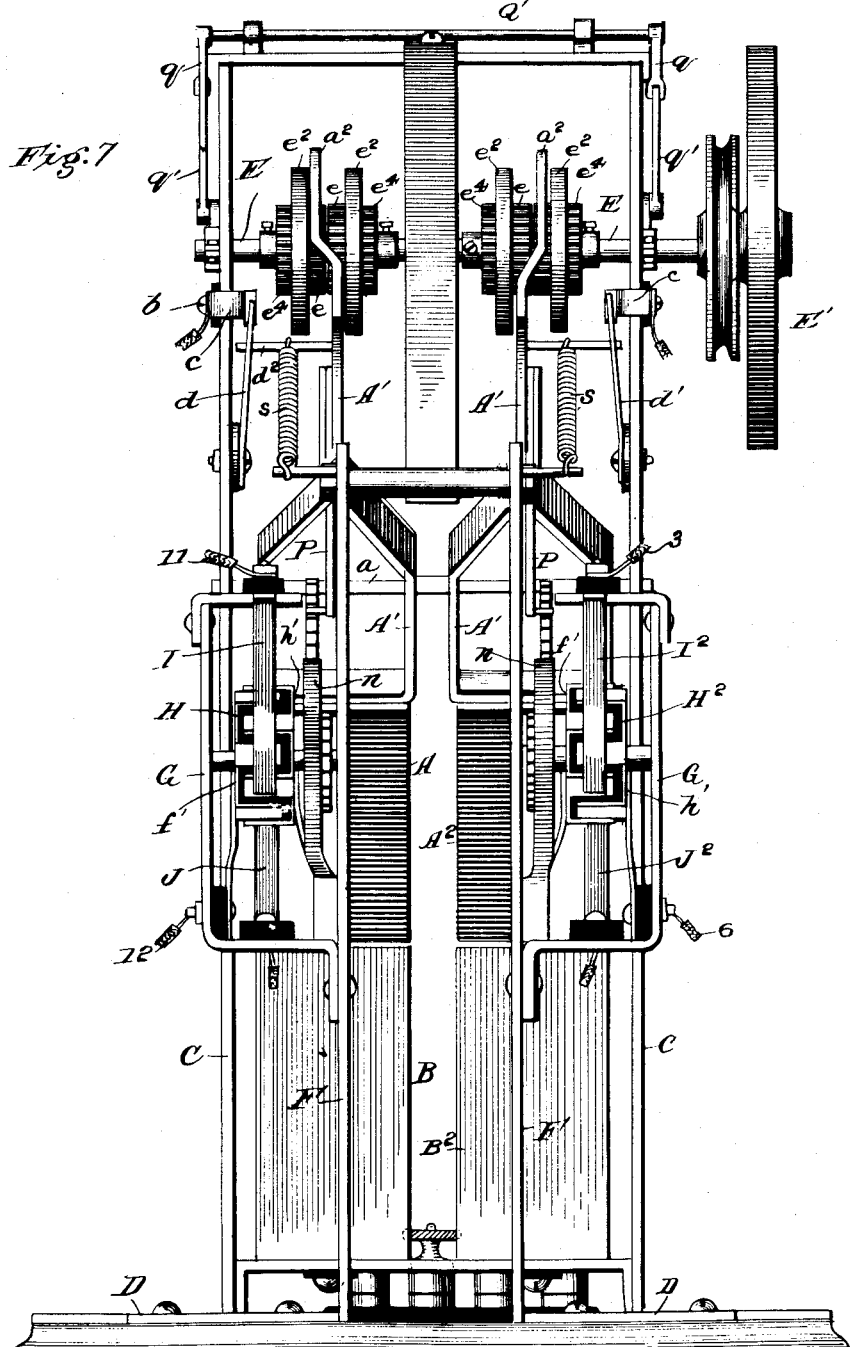

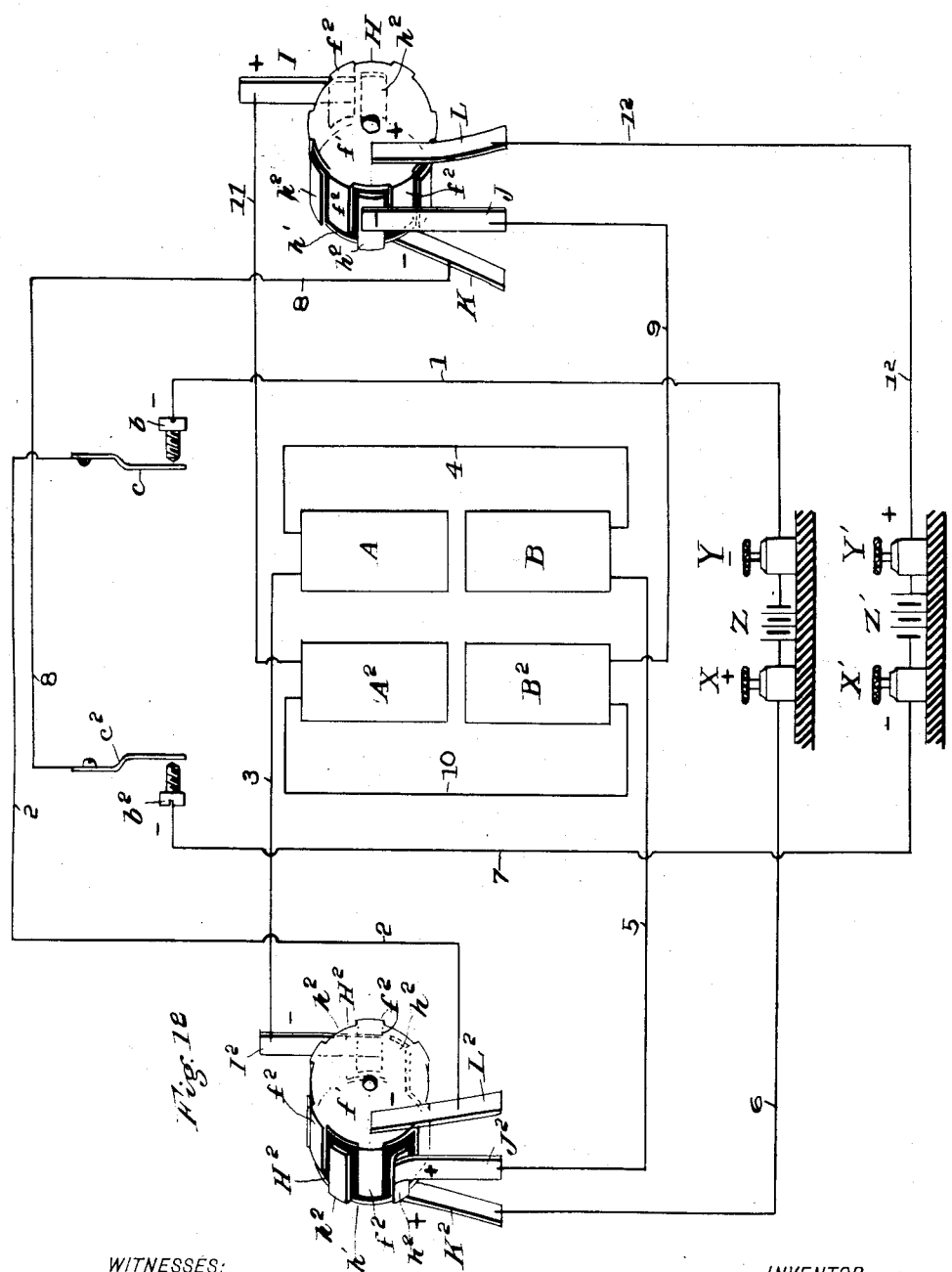

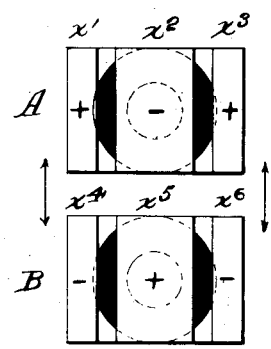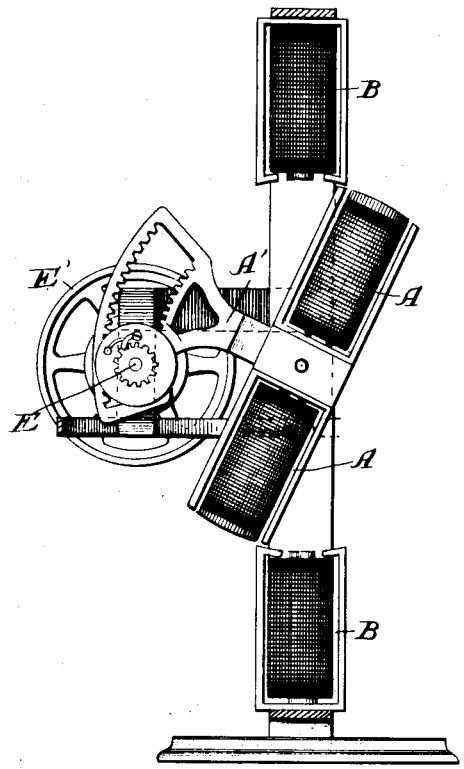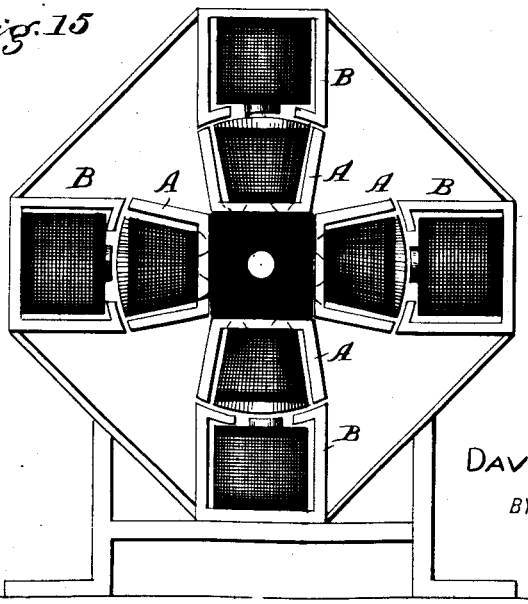

UNITED STATES PATENT OFFICE.

DAVID MENDELSON, OF NEW YORK, N. Y.

ELECTRIC MOTOR.

No. 830,347.   Specification of Letters Patent.   Patented Sept. 4, 1906.

Application filed November 8, 1905. Serial No. 286,334.

*To all whom it may concern:*

Be it known that I, DAVID MENDELSON, a citizen of the United States, residing at the city of New York, borough of Brooklyn, in the county of Kings and State of New York, have invented a new and useful Improvement in Electric Motors, of which the following is a specification.

Numerous attempts have been made to provide an electric motor capable of running on an open circuit. This is a desirable thing to do by reason of the prolongation of the life of the battery or the economical use of the available electric power. Such open-circuit motors have not been practically valuable for the reason that, first, they utilize hardly one-half of the magnetism that the electric current excites in the electromagnet at each contact of the springs or brushes, the balance of the magnetism being dissipated instead of being brought into useful effect; second, the pull of the magnet was too short to do effective work; third, when one electromagnet passes the opposite electromagnet it produces a counter-current to the battery-current, and thus makes the battery-current less effective; fourth, the electromagnet containing the best soft iron has a tendency to retain some magnetism even after the current is cut off from it and through motion or other causes it becomes so charged with magnetism that if it is not cleared of this residual magnetism it becomes a permanent magnet which fails to let go its hold at the intermittent breaks in the current. Some time is required to charge an electromagnet with magnetism, and in like manner some time is required to discharge this magnetism after the current is cut off, and hence if the stationary magnets are still holding the revolving magnets of a motor at a time when they ought to let go their hold in order to allow the revolving magnet to pass it produces a back pull on the axle on which the revolving magnet is mounted, and thus destroys the very momentum and power of the motor that the pull of the magnets has created.

My invention overcomes the difficulties above noted, and in accomplishing such results it comprehends two leading features of principle and construction, as follows: First, I utilize the attraction value of the remote ends of both electromagnets as well as their proximate or adjacent ends—that is to say, in addition to the attraction value between the adjacent ends of the movable magnet and the stationary electromagnet 1 utilize also the attraction value of the two ends of these magnets which are remote from their adjacent poles. The second feature consists in means for reversing the current through the movable electromagnet and stationary electromagnet at short intervals to clear out or prevent the accumulation of residual magnetism.

My improved motor comprises novel means for carrying out these general principles and also various other novel features of construction and arrangement, which I will now proceed to describe, with reference to the drawings, in which—

Figure 1 is a detail side view of a stationary and rotary moving electromagnet, illustrating the means by which I secure a greater effect of magnetic attraction and a better effect of converting electrical energy into mechanical power. Figs. 1$^a$ and 1$^b$ are adjacent end views of these two electromagnets. Fig. 2 is a front elevation of the motor. Fig. 3 is a vertical section on line 3 3 of Fig. 2 looking in the direction of the arrow. Fig. 4 is a sectional view of the upper part of Fig. 2 on the section-line 3 3, but looking in the reverse direction to the arrow. Fig. 5 is a sectional detail on line 5 5 of Fig. 4. Fig. 6 is a side elevation of the upper part of the motor-frame and its attached parts. Fig. 7 is a rear elevation, being the opposite view to that shown in Fig. 2. Figs. 8 and 9 are detail views of the pole-changing commutator. Figs. 10 and 11 are details of the gears for converting oscillating into continuous rotary motion. Fig. 12 is a diagram of circuits, and Figs. 13, 14, 15, and 16 represent modifications of the invention.

Referring to Fig. 1, A represents a rotary moving electromagnet, and B is a stationary electromagnet, the mutual attraction between which in the approaching movement in the direction of the arrow is converted into mechanical power. These electromagnets consist of the usual helix and soft-iron core and have in addition two parallel bars of soft iron $x'$ $x^3$ for the electromagnet A and two similar bars $x^4$ $x^6$ for the electromagnet B, each of which bars lies parallel to the core on opposite sides of the helix and at the proximate or adjacent ends of the electromagnets are separated, but at their remote ends are joined to and in magnetic unity with the remote poles. It will thus be seen that if the lower end of the core of helix $x^2$ be negative the upper end of the core will be positive and the entire length of the parallel bars $x'$ $x^3$ will be positive or of similar polarity to the upper end of the core, which causes the lower ends of bars $x'$ and $x^3$ to be positively charged in the same rotary plane in which the lower end of the core is negatively charged. In like manner if the upper end of the core of electromagnet B is positive then its lower end will be negative and the two flanking parallel bars $x^4$ $x^6$, which are joined to the lower pole of the core, will be negative throughout their entire lengths and also at their upper ends.

The parallel bars form opposite flanking poles to the attracting end of the core and may be either bars, as shown, or a longitudinally-slitted tube embracing the helix or a tube having only its attractive end slitted or cut out to form two similar poles. This arrangement gives a mutually strengthening effect to the members of the magnet, which renders it more effective by reason of the small space between the opposite poles of the same magnet. It will also be noticed that the lower pole of the core of the upper magnet is made coextensive with the end of the helix, as seen in Figs. 1 and 1ª, while the upper pole of the lower magnet is made much narrower, but extends the full diameter of the helix, as seen in Fig. 1ᵇ, while the upper ends of the side bars $x^4$ and $x^6$ are bent inwardly. This is to increase their range of attraction and give a more uniform pull. The adjacent ends of the two magnets are also curved to the circle of a radius extending from the axial center $a$, for the obvious reason of allowing the close approach of the adjacent poles. Now the movable electromagnet A being mounted to swing about an axis $a$ when the approach of the electromagnet A to B in the direction of the arrow takes place, the following influences become manifest: In the first approach of A to B bar $x'$ attracts $x^6$, being of opposite polarity. In the further movement $x'$ and $x^5$ repel, being of like polarity, and $x^2$ and $x^6$ repel, because of like polarity. This repulsion, however, has but little effect on the rotary movement about the axis $a$, because after the repelling-poles pass they aid in the rotary movement by their repulsion. As the electromagnet A swings farther $x'$ and $x^4$ attract, being opposite poles, $x^2$ and $x^5$ attract, being opposite poles, and $x^3$ and $x^6$ attract, being opposite poles. It will be seen, therefore, that there are four attraction influences and only two repulsion influences, and these repulsion influences do not materially affect the rotary motion, for the reason that they are neutralized after they pass the axial line, or, in other words, the last part of the repulsion effect aids in the rotary motion. It will also be seen that the range of attraction movement of magnet A from its full-line position to its dotted position is very great, which gives not only a strong pull but a long pull as well.

The reason that I get such a strong pull of the magnet when I flank it lengthwise with one or two bands of soft iron or steel is not merely because I get two opposite poles, but the main reason is that each helix charges its core with more magnetism than it can actually hold. Now it is easily seen that when the two electromagnets are mounted in an iron back plate or bridge that back plate while it will help to complete the magnetic circuit will absorb the back half of the magnetism of each core that is mounted in it and dissipate it, for it can never send the back magnetism to the front, where it will become of any use, for the reason that it must pass through the very cores that are overcharged already, and that is impossible. I found that by using a heavy band of iron a stronger pull was obtained than a thinner band gave. This has proven to me that the extra saturation of the back pole must pass through neutral iron that is not yet charged with magnetism, for I found that it is not the core that is pulling stronger when the iron band is thicker, but the thicker iron itself is more magnetic. This establishes the fact that every motor in order to utilize all the energy of current must have its magnets flanked by a band of iron or a split iron pipe arranged lengthwise and magnetically connected to the back end of the core in order to bring at the front end two opposite poles to the core, one on each side of the core, and the whole to be mounted on a base of non-magnetic metal.

I am aware that a three-pole electromagnet constructed in accordance with the above principles is not broadly new, but I do not know that both the armature and field magnets have been thus symmetrically constructed with the flanking poles.

It will be understood that the armature and field-magnet poles of dynamos may be constructed and arranged in the same manner and with the same advantages. Now if the axis $a$ of the movable electromagnet A be changed to a position at right angles to that shown, so that the electromagnet A always occupies the plane of the dotted position and vibrates to and from the observer, then (see Fig. 16) $x'$ will always be in the plane of $x^4$, $x^2$ in the plane of $x^5$, and $x^3$ in the plane of $x^6$, and as these parts of one magnet are of opposite polarity to the opposed parts of the other magnet it will be seen that as A approaches B there is an uninterrupted attraction and no repulsion. In either case, however, a succession of electrical impulses sent through both electromagnets, generating the polarity indicated by the signs in Fig. 1, will after a time leave such an amount of residual magnetism in the six members of the two magnets as to make them permanent magnets of the polarity indicated, and when this happens and the circuit of the battery or generator is opened by the brush or contact-breaker magnets A and B will still hang together from this residual and gradually-accumulated magnetism. My invention comprises an automatic mechanism for reversing at short intervals the polarity of the three members of each magnet, which still utilizes their attractive relation, but clears out the residual magnetism.

I will now describe the organization of the motor in which these principles are carried out and made effective.

Referring to Figs. 2 and 3, A $A^2$ are two of the movable electromagnets and B $B^2$ are two of the stationary electromagnets, both of which are constructed and arranged as shown in Fig. 1. C is a non-magnetic upright framework, and D a non-magnetic base upon which the framework is mounted. Within this framework the stationary magnets are fixed in upright position, and in the upper part of the same frame is also sustained the axial shaft $a$, about which the movable and oscillating electromagnets are hung. Each vertical pair of electromagnets is constructed and arranged exactly alike. The movable electromagnet has a rigid framework A' extended above its axial shaft and bearing at its upper end a double row of curved rack-teeth $a'$ $a^2$, facing each other. Between these two rows of teeth there passes the continuously-running main shaft E, bearing at one end a suitable fly-wheel E' and a band-pulley, cog-wheel, or other means for utilizing its power. On this shaft, Figs. 10 and 11, are two loose gear-wheels $e$ $e$, rigidly connected to two corresponding disks $e^2$ $e^2$, bearing on spring-pressed pawls $e^3$ $e^3$, which latter engage with toothed wheels $e^4$ $e^4$, fixed rigidly upon the main shaft E. Only one set of teeth $a'$ or $a^2$ engages one of the small gear-wheels $e$ at one time and the other set being out of engagement, the two sets being used merely for the purpose of reversing the direction of motion of the main shaft, as hereinafter described. Now when either set of teeth $a'$ or $a^2$ is vibrated by the actuating-electromagnet A below it will be seen that on the forward movement of the rack-teeth they turn a small gear-wheel $e$ and disk $e^2$, causing a pawl $e^3$, carried by said disk, to engage and push forward the rigid toothed wheel $e^4$ on the main shaft, and consquently turning the latter. On the backward movement of the rack-teeth the loose gear-wheel $e$ and disk $e^2$ are turned backward on the shaft, and the pawl $e^3$ is carried back to a new position to take a fresh hold upon the ratchet-wheel. After the electromagnet A has gone to its limit of approach to B by magnetic attraction and the current is broken the magnet A is thrown away from B again by a spring $s$, Fig. 3, which at one end is connected to the framework and at the other end is anchored to a part of the frame A' of the electromagnet A above its axial shaft $a$.

I will now describe the means by which the electric current is simultaneously sent through the pair of electromagnets A B and the current reversed at short intervals to prevent the accumulation of residual magnetism.

It will be understood that the circuit is closed through the two electromagnets when they are in the position shown in full lines in Fig. 1 and is broken when the movable electromagnet reaches the position shown in dotted lines in Fig. 1. This work is accomplished by an automatic switch as follows, reference being had to Figs. 2, 4, and 5:

In the upper ends of the upright members of the frame C are arranged for each vertical pair of electromagnets an insulated screw $b$ and a spring $c$, which are, as hereinafter described, made the terminals of the circuit through the pair of electromagnets adjacent thereto. Normally the spring $c$ is out of contact with the screw $b$ and the circuit is broken, but when the spring touches the screw, as in Fig. 5, the circuit is closed through the electromagnets to cause them to exercise their mutual attraction on each other. The opening and closing movement of these terminals is effected by a bifurcated arm $d$ $d'$, which is pivoted at its lower end to the framework C and between whose branches a laterally-projecting pin $d^2$ on the magnet-frame A' extends. One branch of the bifurcated arm bears on its upper end a friction-roller $d^3$, and in one movement of the arm this roller bears against the terminal spring $c$ and forces it into contact with the insulated screw $b$, and in the other movement the roller passes off the spring $c$, and the latter springs out of contact with the said screw, thereby breaking the electrical circuit. The bifurcated arm $d$ $d'$ permits these opening and closing movements to occur at the proper time to send the current through the electromagnets when A is about to approach B and breaks the current after the limit of its movement has been attained. The pin $d^2$ on the vibrating frame A' of the electromagnet, it will be seen, strikes first one branch $d$ of the bifurcated arm and then the other one, $d'$, to produce these movements and constitutes an automatic switch. To vary the intervals of transmission of electrical impulses, this bifurcated arm is of a V shape and receives the pin between its branches and is vertically adjustable to increase or diminish the period of contact.

For reversing the polarity of the adjacent ends of the two electromagnets A and B, I employ a pole-changing commutator and means for shifting it at brief intervals, as best shown in Figs. 3, 7, 8, and 9. Alongside the frame C is erected another upright frame F, bearing on each side a rectangular housing G, in each of which is contained on a horizontal axis a rotary commutator H. This commutator consists of a non-conducting disk, on the opposite faces of which are fixed in insulated relation to each other the two side plates $f'$ $h'$. The side plate $f'$ has spaced metal tongues $f^2$, bent over the periphery of the non-conducting disk, and the side plate $h'$ has in like manner metal tongues $h^2$, bent over the periphery of the non-conducting disk and alternating with the tongues $f^2$ of the other side plate, but spaced apart from the same so that they do not touch.

Four insulated contact-springs I J K L, Figs. 8 and 12, are mounted upon the housing G and connect with separate wires. Two of these contact-springs I J bear upon opposite sides of the disk upon the peripherally-arranged tongues $f^2$ $h^2$, and the other two, K L, of the contact-springs bear against the side plates $h'$ $f'$. These side plates represent opposite poles of the battery, and the springs I J rest at one time with their ends pressing upon the oppositely-charged tongues $f^2$ $h^2$ of the two plates; but if the commutator-disk be turned one space the springs I J will come into contact with the alternating tongues and the polarity will be reversed.

The turning of the commutator at predetermined intervals is effected automatically by the motor as follows, reference being had to Figs. 3, 8, and 9:

On the upright frame F is mounted a ratchet-wheel M, which is arranged in a vertical plane just beside and a little above the commutator-disk. On this ratchet-wheel lies a laterally-projecting pin $p$ of a drag-pawl P, which latter is pivoted to the oscillating frame A' of the electromagnet A, so that as the frame oscillates the drag-pawl will catch into the teeth of the ratchet-wheel and turn it intermittently, back movement of the ratchet-wheel being prevented by a detent $n$. On the side of this ratchet-wheel is fixed a small laterally-projecting pin $m$, which once in the revolution of this ratchet-wheel catches into a tooth of a subjacent ratchet-wheel N, which is fixed rigidly on an extension of the axial shaft of the commutator, so that every time the ratchet-wheel M makes a complete revolution the commutator is turned one space and the polarity of the contact-springs I J is reversed. As shown, this happens at every complete revolution of ratchet-wheel M; but it will be understood that more pins $m$ may be used and the shifting of the poles may occur as frequently as is found necessary to clear out the accumulated magnetic charge of the electromagnet. The ratchet-wheel N has the same number of teeth that the commutator has tongues.

The oscillating electromagnets are arranged as twins and the shifting of the commutator of one pair of electromagnets is effected by the power of the other pair of electromagnets in order to insure continuous motion.

I will now describe the circuits by which the electromechanical features are brought into combined and continuous action, reference being had to the diagrammatic illustration in Fig. 12.

As shown, I employ two batteries Z Z'; but it is obvious that one battery or source of electrical current may be employed with double terminals. I will first trace the path of the circuit from battery Z and then that of Z'.

X and Y are the binding-posts which connect with the battery Z. From the negative side of the battery Z and binding-post Y the current flows over the following path: wire 1, insulated screw $b$, switch-spring $c$, (the spring being closed upon the screw,) wire 2, commutator-spring $L^2$, side plate $f'$, and tongues $f^2$, commutator-spring $I^2$, (which is resting on a tongue $f^2$,) wire 3, electromagnet A, wire 4, electromagnet B, wire 5, commutator-spring $J^2$, (which is resting on tongue $h^2$,) side plate $h'$, commutator-spring $K^2$, wire 6 to binding-post X and the positive side of the battery Z. It will be seen that the left-hand commutator $H^2$ controls the current in the right-hand pair of electromagnets A B. Now if the commutator $H^2$ is turned one space the polarity of the commutator-springs $I^2$ $J^2$ is reversed and the current is sent in reverse direction through electromagnets A B to clear out the residual magnetism. Starting now from battery Z', whose negative pole connects with binding-post X' and whose positive pole connects with binding-post Y', the current flows as follows: from positive binding-post Y', wire 12, commutator-spring L, side plate $f'$ and tongue $f^2$, commutator-spring I, (which is resting on a tongue $f^2$,) wire 11, electromagnet $A^2$, wire 10, electromagnet $B^2$, wire 9, commutator-spring J, (which is resting on a tongue $h^2$,) plate $h'$, commutator-spring K, wire 8, switch-spring $c^2$, insulated screw $b^2$, (spring $c^2$ being temporarily pressed to contact therewith by the automatic switch,) wire 7, to binding-post X', and the negative side of the battery Z'. If now the commutator H be turned one space, the polarity of commutator-springs I J is reversed, and the current is sent in reverse direction through the electromagnets $A^2$ $B^2$.

The reversal of the current through the electromagnets is automatically effected at predetermined intervals, as hereinbefore described; but it will be seen from Figs. 7 and 12 that while the commutator H is turned by the power of electromagnets A B it reverses the current for its associated pair of electromagnets $A^2$ $B^2$, and while the commutator $H^2$ is turned by the power of the electromagnets $A^2$ $B^2$ this commutator effects the reversal of the current for the associated electromagnets A B. Thus the two pairs of electromagnets coöperate with a reciprocal action The purpose of this is to give continuous action and prevent dead-points which might occur by an electromagnet cutting off its own current, each pair of electromagnets helping the other pair.

Although I prefer to construct my motor with the automatic pole-changing commutators, I may when using only one pair of electromagnets A² B² or A B employ an ordinary three-point pole-changing switch, as seen in Fig. 13, to be manually operated to clear out the residual magnetism at will or to be geared to act automatically by the running parts of the motor.

I will now describe the means for reversing the motor, referring more particularly to Figs. 2, 3, and 6. For this purpose the bearings of the main shaft E are vertically adjustable in slots in the side frame, so as to bring the gear-wheels e into engagement either with the top or bottom set of rack-teeth a' a². When the top rack-teeth are so engaged, the main shaft runs in one direction, and when the bottom rack-teeth are engaged the shaft will run in the other direction. It is best, however, in an oscillating motor that the rack-teeth a' a² should operate upon two different gear-wheels e, as seen in detail view, Fig. 10, each of which has its own disk and pawl, but with the pawls reversed in direction, as indicated by dotted lines in Fig. 11. This is to cause the attractive force of the electromagnets to always turn the shaft instead of relying upon the spring to do it, as would otherwise be the case in reversing the shaft direction.

In order to conveniently effect the vertical adjustment of the main shaft for reversing its motion, a handle Q, Figs. 6 and 7, is fixed to a rock-shaft Q', and crank-arms q on the shaft are by links q' connected to the vertically-movable boxes of the main shaft, the shifting lever being provided with suitable locking devices for holding it in either position.

In carrying out my invention I do not confine myself to the upright arrangement of the magnets and main shaft, but may arrange these horizontally, or the oscillating frame A' may extend laterally from the electromagnets and the main shaft and its parts be lowered down to a position at one side, as seen in Fig. 14. This permits me to use both an upper and lower set of electromagnets, as shown.

I furthermore do not confine my invention to an oscillating motor, as the electromagnets A may be arranged radially about an axis in a circular series, as seen in Fig. 15, so as to give a continuous rotary action.

Having thus described my invention, what I claim as new, and desire to secure by Letters Patent, is—

1. An electric motor comprising a stationary electromagnet and a movable electromagnet, both of the same being symmetrically constructed with a core, a helix surrounding the core and one or more flanking magnetic poles connected magnetically to the back end of the core of the electromagnet and extending to the attracting polar face of the core, an automatic switch for intermittently sending a current through the helix and connecting mechanism for operating the switch as described.

2. An electric motor comprising a stationary electromagnet and a movable electromagnet, both of the same being symmetrically constructed with a core, a helix and two magnetic poles connected magnetically at their back ends to the core of the electromagnet and extending in disconnected relation and in parallel position on each side of the helix to a position even with the attracting polar face of the core, an automatic switch for intermittently sending the current through the electromagnets and connecting mechanism for operating the switch.

3. An electric motor comprising two electromagnets, one stationary and the other movable and each having a similar construction of three pole-faces arranged to coincide with each other and consisting each of a core, a helix and two parallel magnetic poles connected magnetically at their back ends to the core of the electromagnets and extending in disconnected relation and in parallel position on each side of the helix to a position even with the attracting polar face of the core, an automatic switch for simultaneously sending the current through both helices and connecting mechanism for operating the switches.

4. An open-circuit electric motor, comprising stationary and movable electromagnets arranged in attractive relation to each other, an automatic switch for sending the current intermittently through the helices, and an automatic pole-changing device for reversing the direction of the current through the electromagnets at predetermined intervals to clear out residual magnetism.

5. An electric motor comprising two pairs of electromagnets, one of each pair being stationary and the other movable, automatic switches with connecting mechanism for sending the current intermittently through the same, and two automatic pole-changing commutators, each commutator being operated at intervals by one pair of electromagnets to reverse the polarity of the other pair of electromagnets as and for the purpose described.

6. An electric motor, comprising two electromagnets, one having a radial swing toward alinement with the other, each electromagnet being flanked with magnetic poles connected magnetically to the back end of the core and extending to the front on each side of the helix to the attracting polar face of the core and forming for each electromagnet a pole of one character for the core and two flanking poles of like character to each other but different from that of the same end of the core, said electromagnet being supported for the movement of its three polar faces transversely across the three polar faces of the other electromagnet as and for the purpose described.

7. An electric motor comprising two electromagnets, one stationary and the other movable and constructed with flanking magnetic poles as described, the movable magnet being hung upon an axis and formed with a rack-bar, a shaft with gear-wheel, pawl and ratchet-wheel for translating oscillating motion into continuous rotary motion, an automatic switch for intermittently sending the current through the electromagnet to cause it to advance with an attractive effect and a spring for returning it as described.

8. An electric motor, comprising two electromagnets, one of which is radially movable, said electromagnets having each two flanking magnetic poles joined magnetically to the back end of the core and extending to the attractive end of the core, one of said electromagnets having a broadened pole face to its core and narrow flanking poles, and the other electromagnet having a narrow pole-face to its core and broad flanking poles.

9. An electric motor, comprising two electromagnets, one of which is hung to oscillate across the pole of the other, a frame connected to the oscillating electromagnet and having a laterally-projecting tappet, a bifurcated switch-arm having divergent branches, receiving between them the actuating-tappet, a contact-spring arranged to be pressed upon by the switch-arm to close the circuit and an adjustable support for the bifurcated switch-arm for changing its relation to the actuating-tappet to lengthen or shorten the stroke as described.

DAVID MENDELSON.

Witnesses:
 EDW. W. BYRN,
 SOLON C. KEMON.